(12) United States Patent
Egidio (10) Patent No.: US 7,004,625 B2
(45) Date of Patent: Feb. 28, 2006

(54) SYSTEM AND METHOD FOR TEMPERATURE SENSING AND MONITORING

(75) Inventor: Paul B. Egidio, Sonoma, CA (US)

(73) Assignee: Acrolon Technologies, Inc., Sonoma, CA (US)

( * ) Notice: Subject to any disclaimer, the term of this patent is extended or adjusted under 35 U.S.C. 154(b) by 0 days.

(21) Appl. No.: 10/442,100

(22) Filed: May 21, 2003

(65) Prior Publication Data

US 2003/0219062 A1    Nov. 27, 2003

Related U.S. Application Data (60) Provisional application No. 60/381,795, filed on May 21, 2002.

(51) Int. Cl.
  *G01K 7/00* (2006.01)
  *G01K 13/00* (2006.01)
(52) U.S. Cl. ............... 374/166; 374/142; 374/112; 374/137; 374/170
(58) Field of Classification Search .......... 374/112, 374/110, 113, 115, 116, 137, 166, 167, 101, 374/111, 141, 208, 170, 142, 163; 99/276, 99/277; 426/15
See application file for complete search history.

(56) References Cited

U.S. PATENT DOCUMENTS

| | | | | |
|---|---|---|---|---|
| 2,753,713 A | * | 7/1956 | Mabey | 374/115 |
| 3,665,766 A | * | 5/1972 | Johnston | 374/115 |
| 4,102,194 A | | 7/1978 | Eng | |
| 4,362,403 A | * | 12/1982 | Mooney | 374/4 |
| 4,593,611 A | * | 6/1986 | Bruch | 99/277.1 |
| 4,672,842 A | * | 6/1987 | Hasselmann | 73/49.2 |
| 4,676,664 A | | 6/1987 | Anderson et al. | |
| 4,699,519 A | * | 10/1987 | Persson | 374/111 |
| 4,881,071 A | | 11/1989 | Monterosso et al. | |
| 4,915,507 A | * | 4/1990 | Janotta | 374/115 |
| 4,916,643 A | * | 4/1990 | Ziegler et al. | 702/188 |
| 4,969,749 A | * | 11/1990 | Hasselmann | 374/115 |
| 5,691,957 A | | 11/1997 | Spiesberger | |
| 6,283,628 B1 | * | 9/2001 | Goodwin | 374/1 |
| 6,421,626 B1 | * | 7/2002 | Yin | 702/132 |
| 6,494,616 B1 | * | 12/2002 | Tokhtuev et al. | 374/137 |
| 6,494,617 B1 | * | 12/2002 | Stokes et al. | 374/152 |
| 6,679,628 B1 | * | 1/2004 | Breinlinger | 374/178 |
| 6,695,469 B1 | * | 2/2004 | Leonhardt | 374/25 |
| 6,704,737 B1 | * | 3/2004 | Nixon et al. | 707/101 |

(Continued)

FOREIGN PATENT DOCUMENTS

DE    3146346 A  *  6/1983

(Continued)

*Primary Examiner*—Diego Gutierrez
*Assistant Examiner*—Mirellys Jagan
(74) *Attorney, Agent, or Firm*—Ditthavong & Carlson, P.C.

(57) ABSTRACT

An approach for digitally measuring temperature in support of a monitoring application is disclosed. Multiple probes, according to one embodiment, are deployed for sensing environmental parameters (e.g., temperature, liquid level, flow). Each probe has a thermally conductive cylindrical housing containing one or more digital temperature sensors. In addition, one of the probes includes analog inputs (e.g., Brix probe, level sensor, and flow sensor). The probes share a common fixed size bus and communicates data from the sensors to a controller. Based upon the collected data, the controller can initiate, for example, a pump-over in a wine-making process. The controller can interface with a data network to a monitoring system configured to store and analysis the collected data. The monitoring system supports access of the stored data over a public data network, such as the global Internet.

14 Claims, 11 Drawing Sheets

U.S. PATENT DOCUMENTS

| | | | |
|---|---|---|---|
| 6,837,619 B1 * | 1/2005 | Cho et al. | 374/163 |
| 2002/0014085 A1 * | 2/2002 | Sakakibara et al. | 62/201 |
| 2002/0152037 A1 * | 10/2002 | Sunshine et al. | 702/23 |
| 2003/0014500 A1 * | 1/2003 | Schleiss et al. | 709/218 |
| 2003/0041135 A1 * | 2/2003 | Keyes et al. | 709/223 |
| 2003/0162539 A1 * | 8/2003 | Fiut et al. | 455/424 |

FOREIGN PATENT DOCUMENTS

| | | | |
|---|---|---|---|
| DE | 3434170 A | * | 3/1986 |
| DE | 29706808 U1 | * | 8/1998 |
| FR | 2671202 A1 | * | 7/1992 |
| FR | 2692345 A1 | * | 12/1993 |
| FR | 2 743 145 | | 7/1997 |
| FR | 2840918 A1 | * | 12/2003 |
| JP | 56082422 A | * | 7/1981 |
| JP | 59026025 A | * | 2/1984 |
| JP | 62261928 A | * | 11/1987 |
| JP | 06269271 A | * | 9/1994 |
| JP | 2002039660 A | * | 2/2002 |

* cited by examiner

SYSTEM AND METHOD FOR TEMPERATURE SENSING AND MONITORING

RELATED APPLICATIONS

The present application is related to and claims the benefit of the earlier filing date of U.S. Provisional Patent Application (Ser. No. 60/381,795), filed on May 21, 2002 and entitled "A Digital Temperature Sensing System"; the contents of which are hereby incorporated by reference.

FIELD OF THE INVENTION

The present invention relates to environmental control monitoring, and more particularly, to a digital temperature sensing system.

BACKGROUND OF THE INVENTION

Environmental monitoring and control systems play a vital role in many industrial applications to ensure proper production and quality. However, these systems traditionally have required manually intensive processes and expensive inflexible equipment.

For example, modern temperature control systems rely on Resistance Temperature Devices (RTDs) for sensing temperature. RTDs are wire wound and thin film devices that work on the physical principle of the temperature coefficient of electrical resistance of metals (i.e. resistance change with temperature). Measuring temperature using RTD technology requires the presence of specialized and highly sensitive electronic circuitry that is capable of accurately measuring small changes in electrical resistance. Typically, RTD interface circuitry produces an output voltage proportional to the RTD resistance, which is either used directly in a voltage comparator system or it is scaled, digitized and then read by a microprocessor where it is converted to temperature via software, based on the published RTD temperature versus resistance characteristics.

The use of RTDs in industrial temperature control applications presents the following problems or issues: (1) RTD interface circuitry must be calibrated for the attached RTD and interconnection components; (2) RTD temperature sensing is error prone in harsh environments; and (3) multiple sensor applications are impractical with RTDs due to wiring constraints and required circuit real estate.

In industrial applications, RTDs are usually located a great distance from the interface circuitry used to read their resistance. The long wires used to make these connections introduce electrical resistance in series with the RTD, which causes a constant temperature offset error that must be adjusted for in the RTD interface circuitry. This lead-wire resistance compensation takes the form of a variable resistor in the RTD interface circuitry and is referred to as offset calibration. The act of calibrating RTD interface circuitry to the particular electrical characteristics of an RTD device and its electrical connection is a labor-intensive process.

RTD interface circuitry must also provide an electrical adjustment that tailors the circuit for the specific "type" of RTD being used. There are many RTD devices, from many different manufactures, each with its unique electrical characteristics (temperature versus resistance). RTD interface circuitry must provide some form of calibration to allow it to accurately read different RTD products (types) or else be specifically designed for one and only one type of device. This calibration facility may be the same adjustment described above, or it may be yet an entirely separate adjustment of its own.

Figure 10:
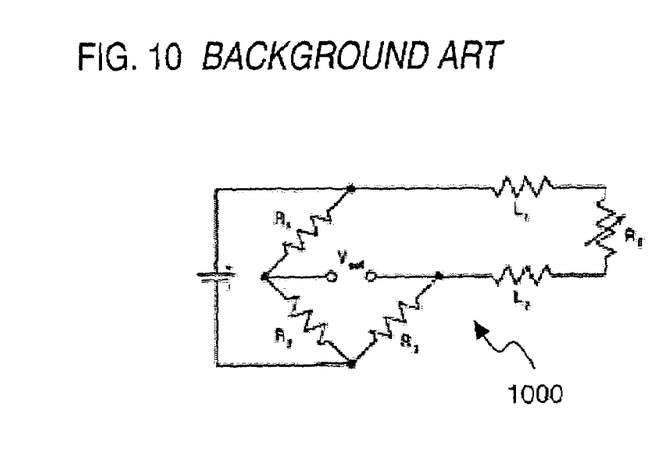
FIG. 10 is diagram of a conventional resistance temperature device (RTD) employing a 2-wire circuit.
Figure 11:
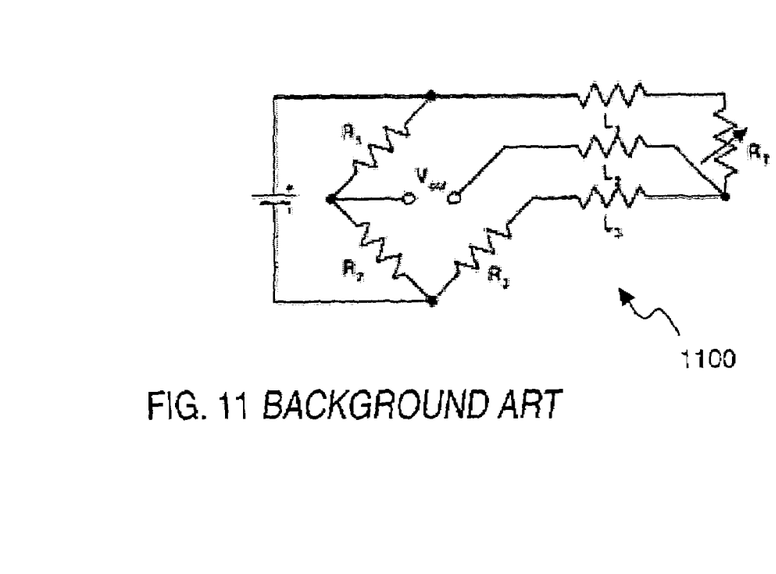
FIG. 11 is diagram of a conventional resistance temperature device (RTD) employing a 3-wire circuit.
Figure 12:
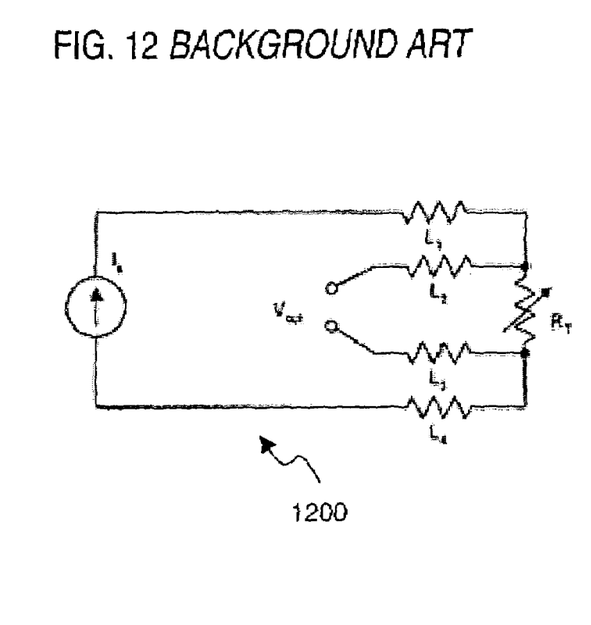
FIG. 12 is diagram of a conventional resistance temperature device (RTD) employing a 4-wire circuit.

In harsh industrial environments (e.g., high moisture and/or caustic chemicals), the electrical contacts used to connect RTDs to their interface circuitry can become severely corroded, causing significant increases in the electrical resistance, which is in series with the RTD. This increase in series resistance translates directly to temperature measurement errors or offsets. Because each RTD sensor requires its own set of electrical wiring and interface circuitry, multiple sensor probes beyond two sensors are impractical. FIGS. 10–12 illustrate this observation in which the various circuits used to read RTDs are described.

FIG. 10 is diagram of a conventional resistance temperature device (RTD) employing a 2-wire circuit 1000. A Wheatstone bridge is the most common approach for measuring an RTD. As RT increases or decreases with temperature, $V_{out}$ also increases or decreases. An operational amplifier (op-amp) is used to observe $V_{out}$. Lead wire resistance, L1 and L2 directly adds to the RTD leg of the bridge.

FIG. 11 is diagram of a conventional resistance temperature device (RTD) employing a 3-wire circuit 1100. In this approach, L1 and L3 carry the bridge current. When the bridge is in balance, no current flows through L2, thus no L2 lead resistance is observed. The bridge becomes unbalanced as RT changes. An op-amp is used to observe $V_{out}$ and prevent current flow in L2. The effects of L1 and L3 cancel when L1 equals L3 since they are in separate arms of the bridge.

FIG. 12 is diagram of a conventional resistance temperature device (RTD) employing a 4-wire circuit 1200. The 4-wire circuit 1200 uses a constant current source to cancel lead wire effects even when L1 does not equal L4. The op-amp is used to observe $V_{out}$ and to prevent current flow in L2 and L3.

Therefore, there is a need for a temperature sensing system that can operate effectively in harsh environments. There is also a need to minimize temperature sensing errors. There is also a need for a temperature sensing system that avoids the time consuming process of calibration. There is a further need for a temperature sensing system that is adaptable to sophisticated and robust monitoring.

SUMMARY OF THE INVENTION

These and other needs are addressed by the present invention in which an approach for digitally measuring temperature and other environmental parameters in support of a monitoring application is provided. Multiple probes, according to one embodiment, are deployed for sensing environmental parameters (e.g., temperature, liquid level, flow) within a tank that stores liquid for an industrial application, such as winemaking. Each probe has a thermally conductive cylindrical housing containing one or more digital temperature sensors. In addition, one of the probes includes analog inputs (e.g., Brix probe, level sensor, and flow sensor). The probes share a common fixed size bus and communicates data from the sensors to a controller. Based upon the collected data, the controller can interface with a data network to a monitoring system configured to store and analyzes the collected data. The monitoring system supports access of the stored data over a public data network, such as the global Internet. The above approach advantageously provides an accurate temperature sensing and monitoring system without the costly procedure of calibration. The approach enhances efficiency of industrial applications by enabling automation of many traditionally manual processes.

According to one aspect of an embodiment of the present invention, an apparatus for sensing temperature is disclosed. The apparatus includes a plurality of digital temperature sensors being housed in a thermally conductive housing. The apparatus also includes a bus having a fixed size for coupling each of the sensors. Further, the apparatus includes a controller coupled to the sensors via the bus for collecting temperature information from each of the sensors.

In another aspect of an embodiment of the present invention, a system for sensing temperature in a tank is disclosed. The system includes a plurality of probes being situated in the tank. Each probe has a housing containing a digital temperature sensor. The system includes a bus having a fixed size for coupling the probes. Further, the system includes a controller coupled to the probes via the bus for collecting temperature information from each of the probes.

In yet another aspect of an embodiment of the present invention, a method for monitoring temperature of a liquid in a tank is disclosed. The method includes immersing a plurality of probes in the liquid. Each probe has a housing containing a digital temperature sensor, wherein the probes couple to a fixed size bus for transmitting temperature data to a controller. The method also includes collecting the temperature data from the controller over a data network.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for performing temperature sensing and monitoring environmental parameters are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
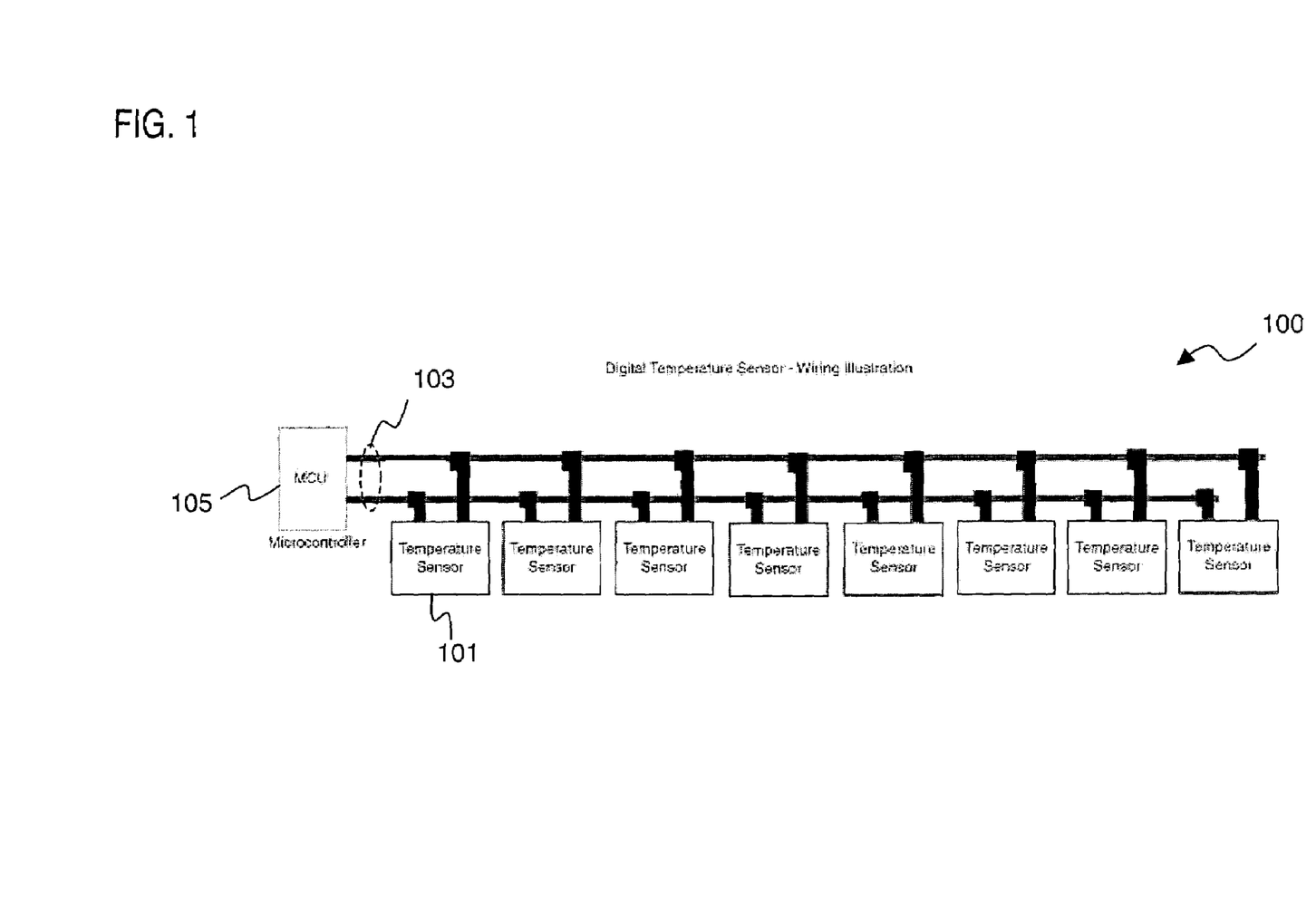
FIG. 1 is a diagram of a digital temperature sensing system, according to an embodiment of the present invention.

FIG. 1 is a diagram of a digital temperature sensing system, according to an embodiment of the present invention. As shown, a digital temperature sensing system 100, in an exemplary embodiment, is adapted for industrial temperature control applications, such as winemaking. The system 100 includes multiple digital temperature sensors 101 coupled to a fixed-sized bus 103 (e.g., 2-wire bus) for communication with a microcontroller 105. The use of multiple sensors 101 advantageously provides accuracy and redundancy. The number of sensors 101 depends on the application; for example, one to eight sensors 101 are appropriate for a variety of applications. These sensors 101 generate temperature data of the environment and transmit the data to the microcontroller 105.

Figure 5:
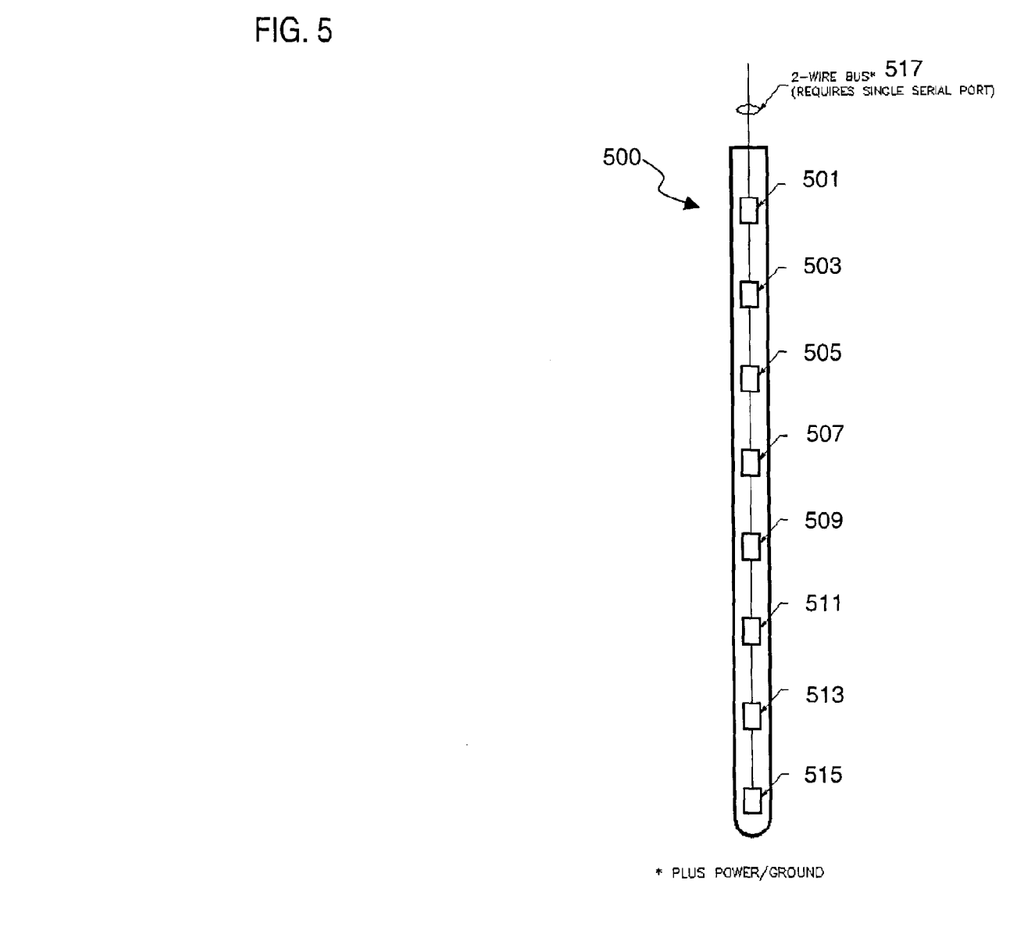
FIG. 5 is a diagram of a single temperature sensing probe employing multiple temperature sensors, in accordance with an embodiment of the present invention.

The spacing of the sensors 101 along the bus 103 is equally positioned to determine temperature variation from the first sensor to the last sensor. However, the spacing of these sensors 101 can be arranged according to the application. The sensors 101, according to an embodiment of the present invention, can be implemented in a thermally conductive housing as seen in FIG. 5.

Figure 6A:
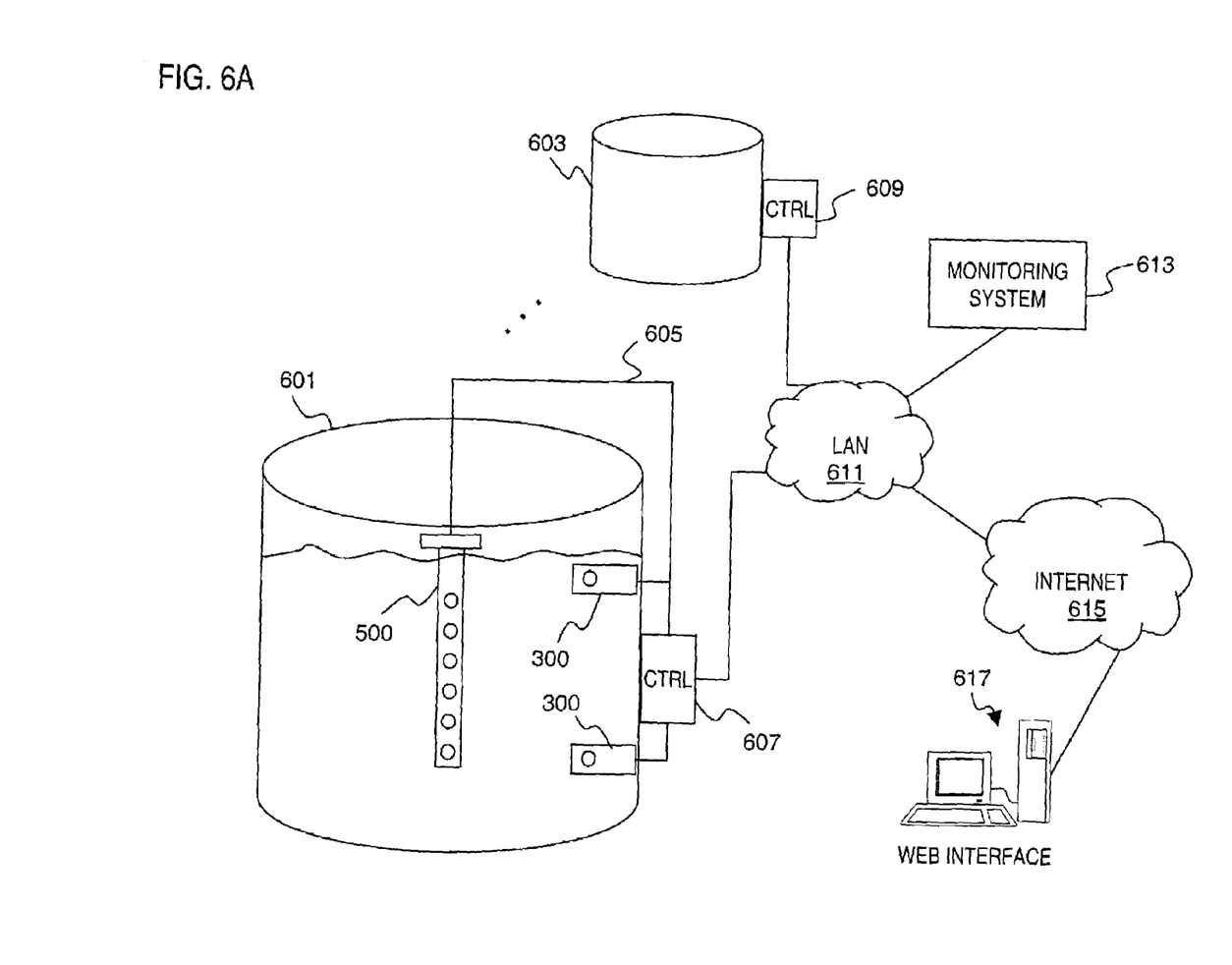
FIGS. 6A and 6B are, respectively, a diagram of a monitoring system capable of collecting temperature information from multiple controllers of the temperature sensing probes of FIGS. 3 and 5, and a diagram of a system utilizing multiple temperature sensing probes to measure temperature differentials and to initiate a pump-over action for equalizing the temperature throughout the volume of liquid, in accordance with an embodiment of the present invention.
Figure 6B:
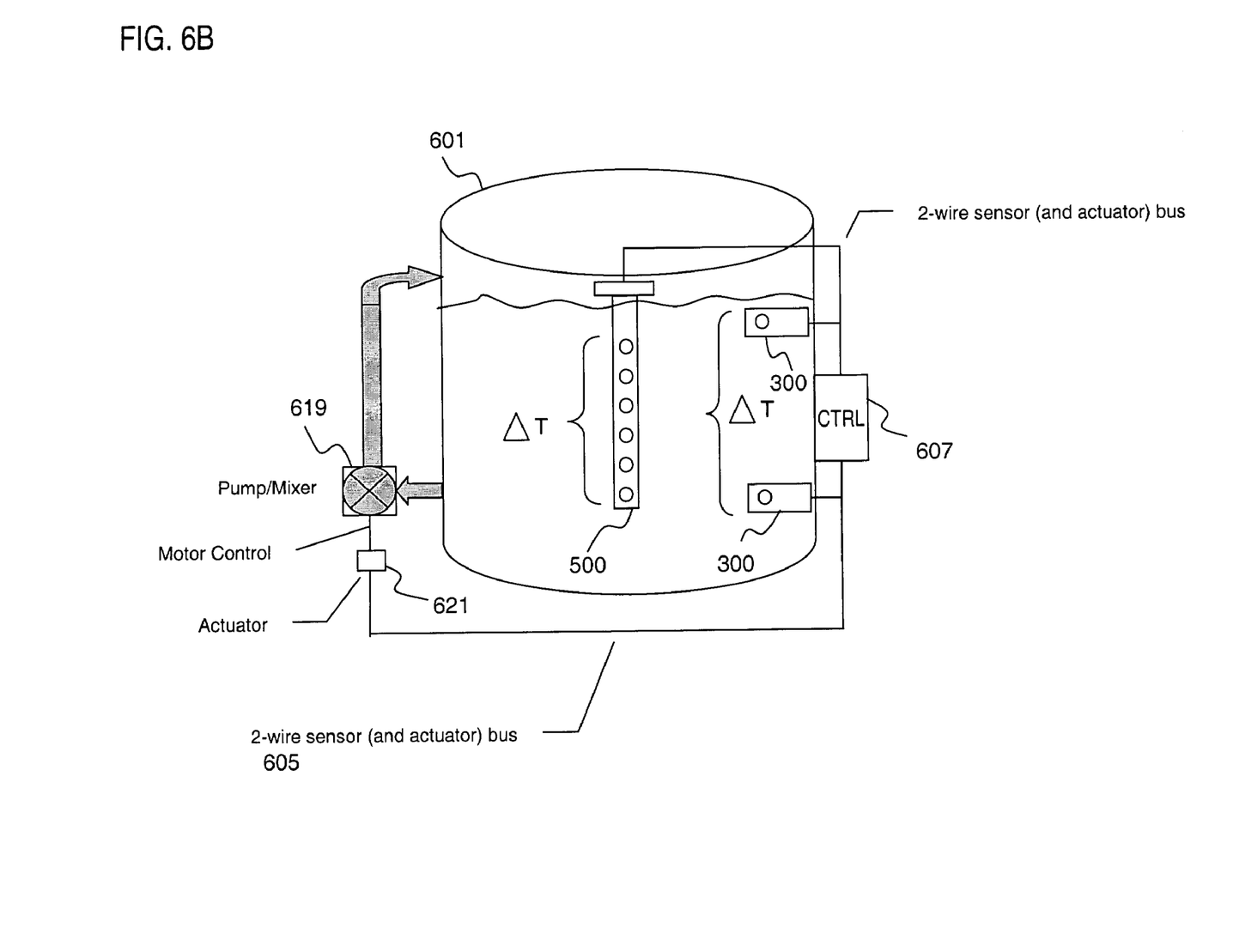

In another embodiment of the present invention, the system 100 employs a 4-wire bus, two of which (not shown) can be used for powering remote sensors and actuators (such as in the system of FIG. 6B). However, remote devices may acquire power from a source other than the controller 105 (as is the case with Brix probes shown in FIG. 2), in which case only two wires would be required from the controller.

Figure 2:
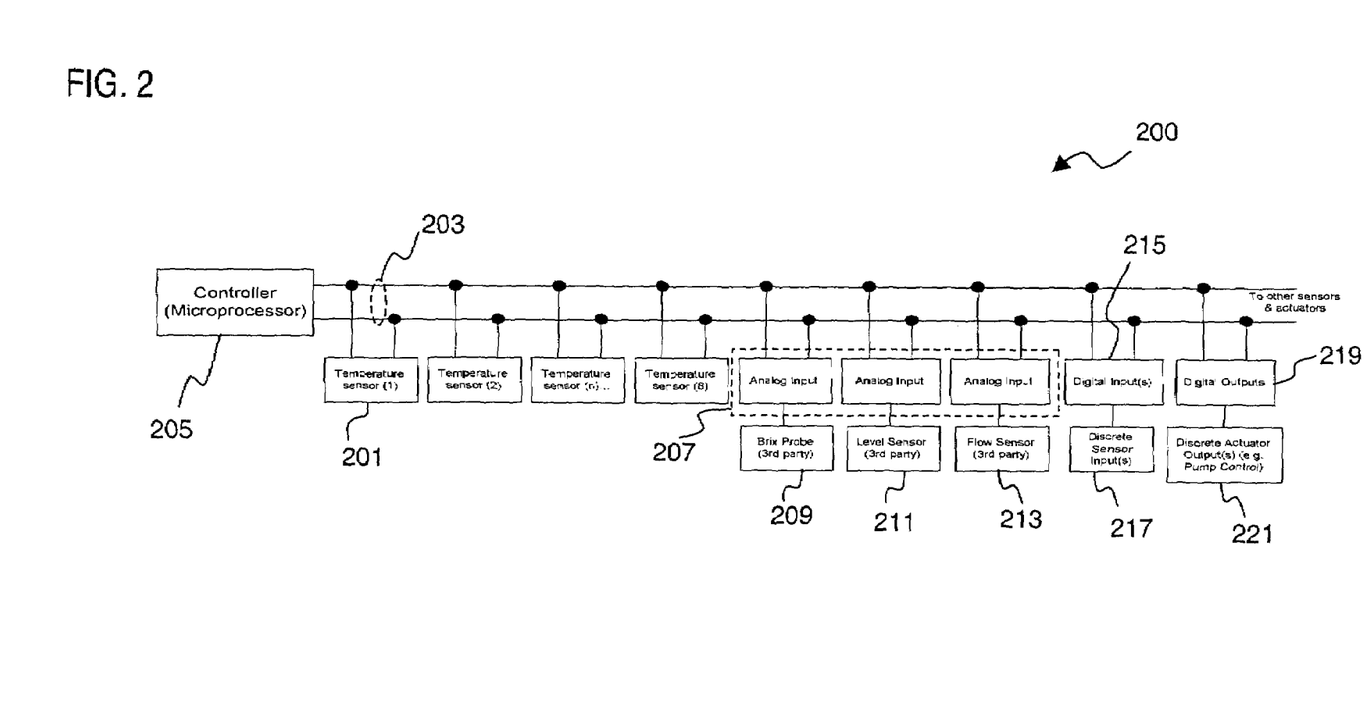
FIG. 2 is a diagram of a temperature sensing system capable of supporting variety of analog and digital modules, according to an embodiment of the present invention.

FIG. 2 is a diagram of a temperature sensing system capable of supporting variety of analog and digital modules, according to an embodiment of the present invention. Under this scenario, a system 200 provides the capability of the system 100 above using multiple digital sensors (and actuator) 201 attached to a fixed bus 203 and communicating with a microcontroller 205 (i.e., controller).

By way of example, as in the winemaking process, the bus 203 can be deployed as a local sensor (i.e., local to a tank)

and actuator bus that, in addition to monitoring temperature, provides the controller 205 with an ability to monitor and control many other important parameters for winemaking. In recognition of this, the bus 203 supports attachable circuits (or expansion modules) capable of reading the level of wine in the tank, flow (of coolant or heat medium in jacket of the tank), and Brix data. Accordingly, the system 200 additionally includes multiple analog inputs 207; each of these analog inputs 207 can accommodate various devices, such as a Brix probe 209 to capture Brix data, a level sensor 211 to determine the fluid level, and a flow sensor 213 for measuring flow of the liquid.

The Brix probe 209 captures parameters in the wine fermentation process, thereby stimulating the automation of a number of traditionally manual processes associated with monitoring fermentations. Conventionally, each tank is visited in which a sample of wine is removed from the sample port and to perform a measurement by hand—this process, thus, is a labor intensive procedure.

Another labor intensive operation, which must be carried out several times a day for each and every tank of wine being fermented at the winery, is the pump-over. The frequency and duration of these pumpers is part a mechanical process and part artistry in the art of winemaking. Temperature is a key factor in the pump-over process. The desire to extract more flavors and tannins from the skins of the grapes or mash in the tank can dictate when a pump-over is executed.

Further, one or more digital inputs 215 can be attached to the bus 203; the digital input 215, in an exemplary embodiment, is a discrete sensor input 217. The system 200 can also supply one or more digital outputs 219. In this example, the digital output 219 can be a discrete actuator 221 (e.g., pump control). This pump control mechanism can be used to automatically initiate a pump-over. By contrast, in the conventional approach, pump over operations are scheduled by the winemaker and then manually carried out by a cellar crew. A pump over operation usually involves moving a pump into position near the tank, attaching hoses to the fittings on the tank and to ports on the pump and then starting the motor. Also, under the conventional approach, the cellar crew must remain for the duration of the pump over in order to end the pump over.

The sensors 201 along with the analog input devices 209, 211, 213, digital input 215 and digital output 219, according to one embodiment of the present invention, constitute a temperature sensing probe that is contained in a water-sealed housing for placement in the tank.

Figure 3:
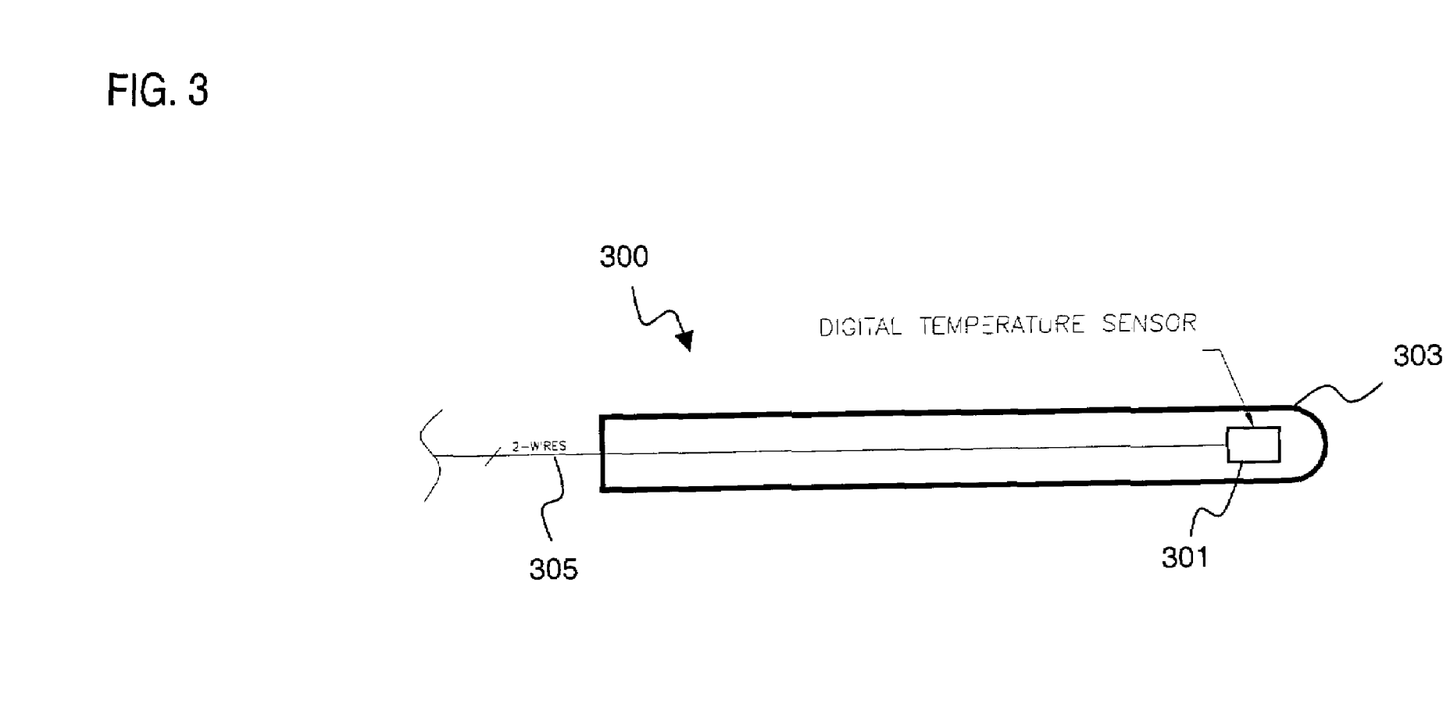
FIG. 3 is a diagram of an exemplary temperature sensing probe, in accordance with an embodiment of the present invention.

FIG. 3 is a diagram of an exemplary temperature sensing probe, in accordance with an embodiment of the present invention. A temperature-sensor probe 300 contains a digital temperature sensor chip 301, which is housed in a cylindrical tube 303 having a semi-circular cap and can provide a temperature accuracy, for example, of ±0.5 degrees Celsius. According to one embodiment of the present invention, the temperature sensor 301 is housed in a hermetically sealed, stainless steel tube. It is recognized that any number of thermally conductive material can be employed; for example, metallic (e.g., aluminum, copper, silver alloy, etc.), ceramic, etc. This probe package can be used in a variety of temperature measurement and control applications.

According to an embodiment of the present invention, the probe 300 is, itself, scalable (as shown in FIG. 6A), allowing for up to eight temperature sensors 303 to be attached to a 2-wire serial bus 305 (e.g., PHILLIPS® SEMICONDUCTOR I2C bus). In this case, a single sensor 303 communicates temperature information directly to a microprocessor (not shown). The microprocessor (or controller) can control multiple probes (as shown in FIG. 4).

By contrast, if multiple RTDs sensors were to be employed, a fixed-bus cannot be utilized; further, separate interface circuitry would be required for each sensor, thereby making such an approach expensive and complex.

The digital temperature probe 300 provides a number of advantages. The digital temperature probe 300 does not require calibration—which, as discussed, is a costly process. Importantly, the digital probe 300 uses serial communications to read temperature directly from the sensor chip 301. This architecture minimizes temperature measurement errors due to poor calibration techniques, faulty wiring or corroded electrical contacts. With conventional RTDs, sensor calibration is needed to compensate for different RTD types and excessive lead resistance and contact corrosion. With the digital probe 300, multiple sensors become practical in that additional sensors do not require additional sensor wires and interface circuitry. For example, additional temperature sensors can be clipped onto the 2-wire serial probe bus—no additional wires or interface circuitry is needed (as seen in FIGS. 1 and 4).

Figure 4:
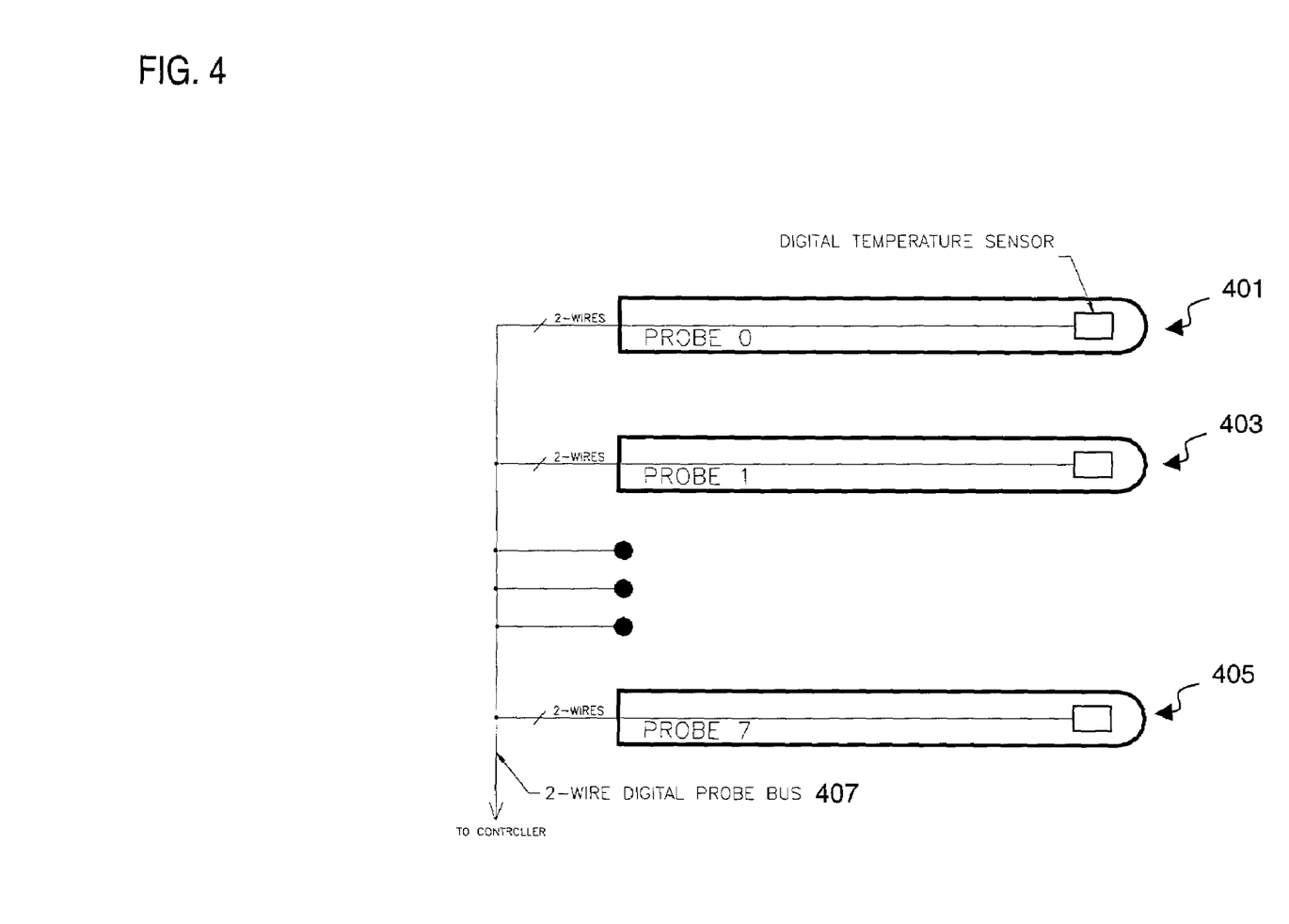
FIG. 4 is a diagram of a system utilizing multiple temperature sensing probes, in accordance with an embodiment of the present invention.

FIG. 4 is a diagram of a system utilizing multiple temperature sensing probes, in accordance with an embodiment of the present invention. This figure shows the versatility of the architecture of the digital probe, whereby multiple digital probes 401, 403, 405 can be deployed, utilizing a single 2-wire bus 407 that couples to the controller. As shown, eight probes are clamped onto the bus 407. Each of the probes, in this embodiment, contains a single digital temperature sensor and housed in separate tubes. This series of probes 401, 403, 405 can be, for example, lowered into a tank and vertically spaced to measure temperature differences based on depth (shown in FIG. 6A). Alternatively, a single housing tube can possess multiple sensors can be dropped into a tank and positioned vertically within the tank, as described with respect to FIG. 5.

FIG. 5 is a diagram of a single temperature sensing probe employing multiple temperature sensors, in accordance with an embodiment of the present invention. A single digital probe 500 can be implemented with multiple temperature sensors 501–515. The multi-sensor probe 500, in an exemplary embodiment, contains between six and eight digital temperature sensors 501–505, which are evenly distributed along a customizable length of enclosed thermally conductive housing (e.g., stainless steel tubing).

The multi-sensor probe 500 attaches to the digital temperature controller's 2-wire sensor bus 517 and is designed to be hot-plugged and unplugged (and hot-swappable) without permanently disrupting thermostatic operation. This hot-pluggable capability allows the probe to be moved from tank to tank (as shown in FIG. 6A) as desired by an administrator (e.g., winemaker). Together with a digital temperature controller, the multi-sensor probe 500 provides, for example, a winemaker insight into wine temperature stratification that occurs during, for example, the fermentation process. The multi-sensor probe completely eliminates the inherent inaccuracies associated with traditional single-point temperature measurement systems offered by competing systems.

FIG. 6A is a diagram of a monitoring system capable of collecting temperature information from multiple controllers of the temperature sensing probes of FIGS. 3 and 5, in accordance with an embodiment of the present invention. For the purposes of explanation, the use of multi-sensor probe 500 (FIG. 5) and the digital probe 300 (FIG. 3) is described with respect to the winemaking process. The multi-sensor probe 500 (which can be used in conjunction with the digital probes 300) provides a more complete and accurate account of wine temperatures in large storage tanks 601, 603 during fermentation. The multi-sensor probe of FIG. 5 advantageously improves the accuracy and completeness of temperature measurement in large tanks 601, 603, and hence, facilitates better temperature control. Under the conventional approach, the same multiple-sensor probe using RTD devices would require a minimum of 16-wires (if a 2-wire interface circuit is used) or as many as 32-wires (if a 4-wire interface circuit is used) as well as eight separate RTD interface circuits, each with its own calibration controls.

According to an embodiment of the present invention, there are two digital probes 300 located at the traditional temperature sensor locations and a multi-sensor probe 500 that spans the height of the tank 601. Together with the digital temperature controller 607, complete and accurate temperature monitoring and control is achieved.

The multi-sensor probe 500 can be inserted into the wine (liquid) through the top of the tank 601 and held in place by a compression fitting or it can simply be dropped into the wine directly. This probe 500, as noted, can contain between six and eight digital temperature sensors. All sensors attach to the same 2-wire communications cable and plug directly into the 2-wire digital sensor bus 605 for communication with a controller 607.

In large liquid storage and fermentation tanks 601, 603, temperature is typically measured in one or possible two locations, regardless of the size of the tank. Tanks sizes can range from 500 gallons to 30,000+ gallons. The temperature is sampled only about 12 to 16 inches in from the sidewall of the tank 601 near the lower and/or upper ⅓ of the tank 601. Conventionally, the typical sensor locations do not provide for a complete or accurate indication of the overall temperature of the liquid throughout the tank. Yet, temperatures measured at these points are used to control critical thermostatic operations and in the case of wine fermentation, also determine when the contents of the tank 601 should be mixed (pumped-over). This mixing process is more fully described below with respect to FIG. 6B.

As seen in FIG. 6A, each of the tanks 601, 603 contains a controller 607, 609, respectively. The controllers 607 interface with a data network, such as a local area network (LAN) 611 for transmission of the temperature data (or other environmental information such as Brix data, level and flow data) from the many probes to a monitoring system 613. The LAN 611 can be any type of network, such as Ethernet, Token Ring, Fiber Distributed Data Interface (FDDI), and Asynchronous Transfer Mode (ATM).

The monitoring system 613 provides storage and analysis of the collected data from the controllers 607, 609. The monitoring system 613 can also support reporting and alarm functions. Further, data relating to the monitoring of the tanks 601, 603 can be made available over a public data network, such as the Internet 615, to a host 617 through a graphical user interface (GUI), such as a web-based interface. In this manner, the winemaker, as a user on the host 617, can maintain control over the winemaking process over nearly anywhere Internet access can be obtained.

FIG. 6B is a diagram of a system utilizing multiple temperature sensing probes to measure temperature differentials within a tank of wine and to initiate a pump-over action or some other form of liquid mixing action aimed at equalizing the temperature throughout the volume of liquid. The goal of wine fermentation is to convert most or all of the sugar in the fruit to alcohol. This is achieved through a chemical process wherein yeast is used as the primary catalyst. During fermentation process, heat energy is released which causes wine temperatures to rise significantly, especially in the top few feet of the liquid, known as cap (where all of the skins and others solids collect and form a thick, solid mass that can get many degrees hotter than the rest of the liquid in the tank).

A desirable fermentation for wine is one in which the chemical conversion process progresses gradually and continually over the course of a couple or few days until most or all of the sugar has been consumed by the yeast and turned into alcohol. Managing fermentations is the primary function of a winemaker during harvest. The quality of the wines produced depends a great deal on how well the winemaker is able to achieve slow yet continuous fermentations.

For red wines, the object is to ferment at relatively high temperatures to achieve good flavor and tannin extraction from the skins of the fruit. Too much heat, however, can kill the yeast and thus cause the fermentation process to stall or stop altogether. Therefore, in order to achieve fermentation relatively high temperatures without killing the yeast in the cap, it becomes necessary to mix or pump the wine over onto itself until these differences in temperature are equalized. Typically, this mixing or pump-over process is performed multiple times day per wine lot during fermentation and is based on a manual comparison of cap temperature (usually also taken manually) to the temperature of the liquid as read by a tank mounted sensor or probe.

The controller 607 can be expanded to control and pump and to monitor wine levels, gases, Brix data, flow (all in addition to the basic temperature monitoring and control). To get the same functionality with traditional control products, wineries would be forced to purchase a controller capable of handling all conceivable tank sensors and actuators. Further, such monitoring and control processing equipment is located in a central location, which requires that for each remote sensor and actuator (for each remote tank) a cable be pulled back to the central control panel. This adds considerable expense to the system because, in a typical facility, many thousands of feet of expensive cable. However, with each tank equipped with a local controller 607 and the flexibility of the probe architecture, the winemaker can simply add input/output (I/O) expansion modules as needed to fulfill a particular monitoring and control requirement.

A winemaker would use Brix ranges, temperature ranges, temperature differentials, minimum number of pump overs per day and any combination thereof, to regulate their fermentations. For instance, thermostat set points could be adjusted based on Brix ranges while the frequency and duration of pump over events could be increased or decreased depending on temperature and Brix ranges.

As shown in FIG. 6B, multiple sensors, particularly those FIG. 2, could be used to detect such temperature differentials and other parameters (e.g., Brix data) and to automatically initiate a pump-over or mixing action based on a user-programmable threshold. A pump/mixer 619 is controlled by an actuator 621. It is noted that the pump-over/mixing motor control is also attached to the 2-wire sensor bus 605. This further demonstrates the unique adaptability in accordance with an embodiment of the present invention.

With respect to FIGS. 6A and 6B, it is noted that long multi-sensor probe 500 can be used "stand-alone" or with the two traditional probes 300. When used stand alone, the probe 500 can house up to eight digital temperature sensors. When used with probes at the sensor locations shown, the deep probe 500 can house eight sensors minus the number of discrete digital probes used.

Figure 7:
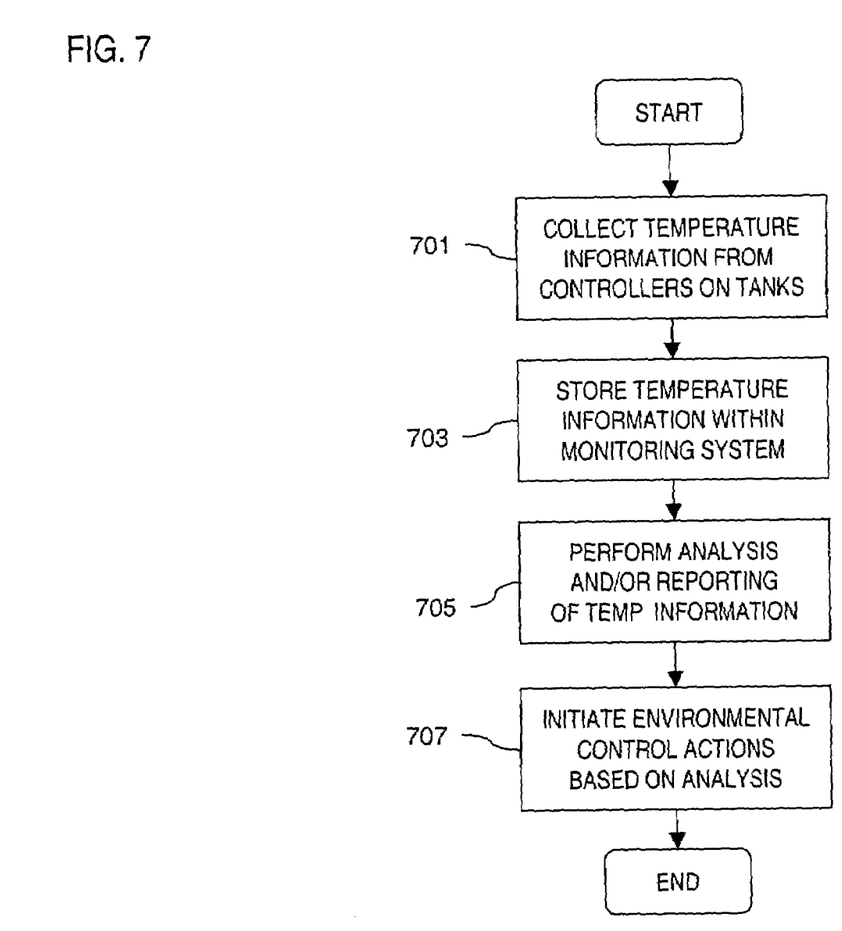
FIG. 7 is a flowchart of a monitoring process used in the system of FIG. 6A.

FIG. 7 is a flowchart of a monitoring process used in the system of FIG. 6A. In the system of FIG. 6A, the monitoring system 613 can retrieve the temperature data and/or measured parameters (e.g., Brix data) from the controllers 607, 609 over the LAN 611, per step 701. In step 703, the data is stored within a database of the monitoring system 613. The system 613 can then analyze the collected data according to the winemaking process prescribed by the winemaker (step 705). Upon analyzing the data, the monitoring system 613 can initiate environmental control actions, as in step 707, such as starting the pump-over of the tank 601.

As described earlier, any data generated and maintained by the monitoring system 613 can be accessed by the host 617 over the Internet 615.

Figure 8:
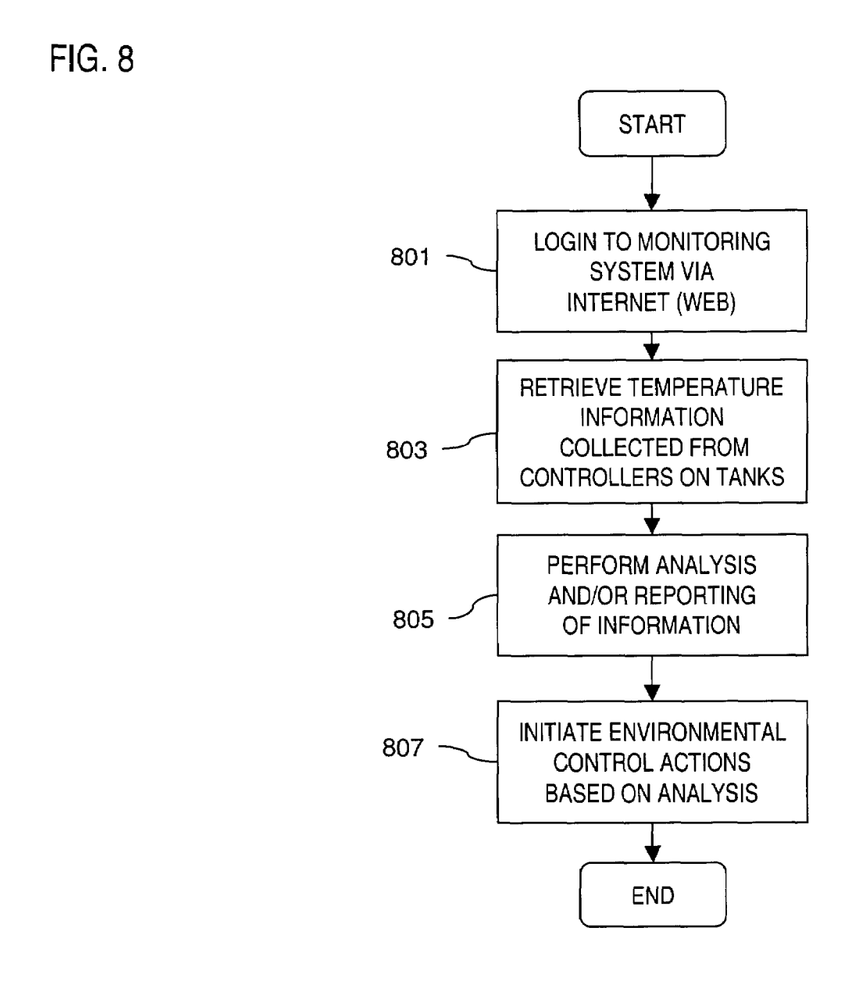
FIG. 8 is a flowchart of a process for monitoring the system of FIG. 6A over a public data network (e.g., Internet)

FIG. 8 is a flowchart of a process for monitoring the system of FIG. 6A over a public data network (e.g., Internet). In step 801, the user logs in to the monitoring system 613 via the Internet 615 using a web interface (e.g., web browser). The monitoring system 613 can employ a standard login authentication process, such as a user identifier (ID) and a password, to ensure the user has authority to access the system 613. The host 617, as in step 803, retrieves the data that has been collected from the tanks 601, 603 or a report from the monitoring system 613. It is recognized that the host 617 can locally perform analysis and/or reporting of the data that is accessed from the monitoring system 613. This scenario permits the monitoring system 613 to be equipped with modest computing power, in that processing power can be supplied by the host 617 as well in analyzing the collected data. The host 617 can also initiate environmental control actions over the Internet 615 in response to the analysis of the collected data from the probes.

Figure 9:
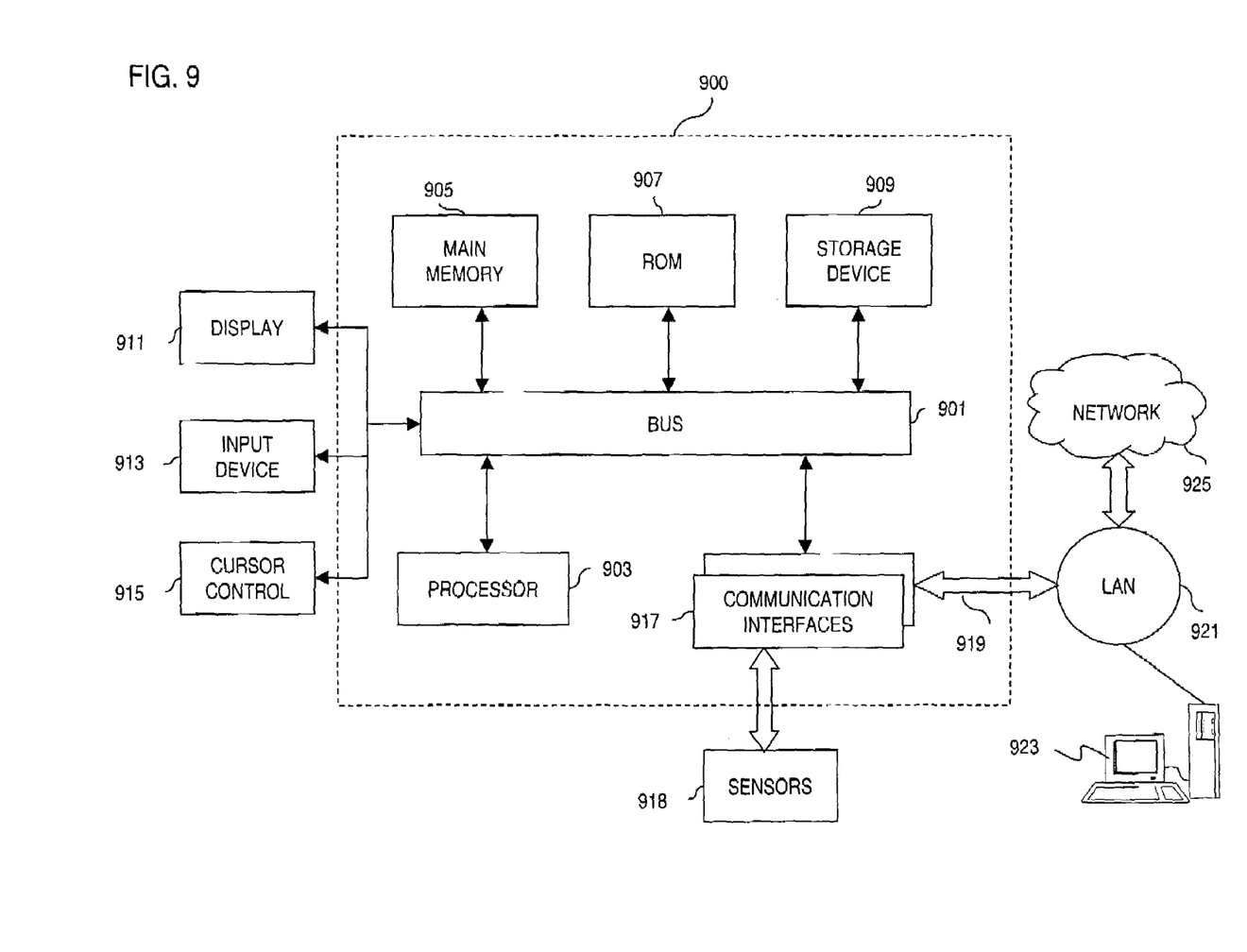
FIG. 9 is a diagram of a computer system that can be used to implement an embodiment of the present invention.

FIG. 9 illustrates a computer system 900 upon which an embodiment according to the present invention can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to one embodiment of the invention, monitoring and control of temperature is provided by the computer system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the present invention. Thus, embodiments of the present invention are not limited to any specific combination of hardware circuitry and software.

The computer system 900 also includes communication interfaces 917 coupled to bus 901. One of the communication interfaces 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Another communication interface 917 couples to one or more temperature sensors 918 for collecting temperature data, as described with respect to FIGS. 4 and 5. It is noted that a variety of other communication interfaces 917 may be utilized depending on the particular applications and media.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and network 925 both use electrical, electromagnetic, or optical signals to convey information and instructions. The signals through the various networks and the signals on network link 919 and through communication interface 917, which communicate digital data with computer system 900, are exemplary forms of carrier waves bearing the information and instructions.

The computer system 900 can send messages and receive data, including program code, through the network(s), network link 919, and communication interface 917. In the Internet example, a server (not shown) might transmit requested code belonging an application program for implementing an embodiment of the present invention through the network 925, local network 921 and communication interface 917. The processor 903 may execute the transmitted code while being received and/or store the code in storage device 99, or other non-volatile storage for later execution. In this manner, computer system 900 may obtain application code in the form of a carrier wave.

The term "computer-readable medium" as used herein refers to any medium that participates in providing instructions to the processor 905 for execution. Such a medium may take many forms, including but not limited to non-volatile media, volatile media, and transmission media. Non-volatile media include, for example, optical or magnetic disks, such as storage device 909. Volatile media include dynamic memory, such as main memory 905. Transmission media include coaxial cables, copper wire and fiber optics, including the wires that comprise bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, the present invention provides an approach for digitally measuring temperature and other measured parameters for control and monitoring of an industrial application, such as winemaking. The approach permits accurate collection of data and automation of environmental control actions.

While the present invention has been described in connection with a number of embodiments and implementations, the present invention is not so limited but covers various obvious modifications and equivalent arrangements, which fall within the purview of the appended claims.

What is claimed is:

1. A system for sensing temperature in a tank, comprising:
   a plurality of probes being situated in the tank, each probe having a housing containing a digital temperature sensor, wherein one of the probes is a center probe including a plurality of digital temperature sensors arranged vertically;
   a bus having a fixed size for coupling the probes; and
   a controller coupled to the probes via the bus for collecting temperature information from each of the probes, wherein the center probe is situated at approximately a central position of the tank coupling to the bus for transferring data to the controller, and wherein the plurality of probes are hot-swappable such that each of the plurality of probes can be plugged and unplugged from the system without disrupting thermometric operation of the system.

2. A system according to claim 1, wherein the probes are arranged in a vertical sequence near an inner side wall of the tank for determining temperature gradient based on depth of the tank.

3. A system according to claim 1, further comprising:
   another controller coupled to a second plurality of probes that are deployed in another tank for collecting temperature information from each of the second plurality of probes, wherein the controllers interface with a data communication network for transmitting the temperature information to a monitoring system.

4. A system according to claim 3, wherein the temperature information is transmitted from the data communication network to a remote host via a web-based interface.

5. A method for monitoring temperature of a liquid in a tank, comprising:
   immersing a plurality of probes in the liquid, each probe having a housing containing a digital temperature sensor, wherein the probes couple to a fixed size bus for transmitting temperature data to a controller;
   immersing a center probe, which includes a plurality of digital temperature sensors arranged vertically, in the liquid at approximately a central position of the tank, wherein the center probe couples to the bus for transferring temperature data to the controller, and wherein the plurality of probes are hot-swappable such that each of the plurality of probes can be plugged and unplugged from the system without disrupting thermometric operation of the system; and
   collecting the temperature data from the controller over a data network.

6. A method according to claim 5, wherein the plurality of probes are arranged in a vertical sequence near an inner side wall of the tank for determining temperature gradient based on depth of the tank.

7. A method according to claim 5, further comprising:
   activating a pump to mix the liquid in the tank in response to the collected temperature data.

8. A method according to claim 5, wherein one of the plurality of probes includes a Brix sensor for outputting Brix data, the method further comprising:
   activating a pump to mix the liquid in the tank in response to the collected temperature data and the Brix data.

9. A method according to claim 5, wherein the liquid is wine and the plurality probes provide temperature data during the wine fermentation process.

10. A method according to claim 5, wherein each of the sensors within one or more of the probes is hot pluggable.

11. A method according to claim 5, wherein the center probe includes a fixed sized bus that couples to the corresponding digital temperature sensors, and the center probe has a length that spans about the height of the tank.

12. A method according to claim 5, further comprising:
    collecting temperature data from another controller coupled to another set of probes that are deployed in another tank over the data network.

13. A method according to claim 12, wherein the controllers interface with the data network for transmitting temperature data to a monitoring system.

14. A method according to claim 13, wherein the temperature data is transmitted from the data network to a remote host via a web-based interface.

* * * * *